Dec. 29, 1964  A. R. SCHERTZ  3,163,079
FAST ACTION SELF LOCKING THREADED CONNECTOR
WITH RIGHT AND LEFT HAND THREADS
Filed April 5, 1963
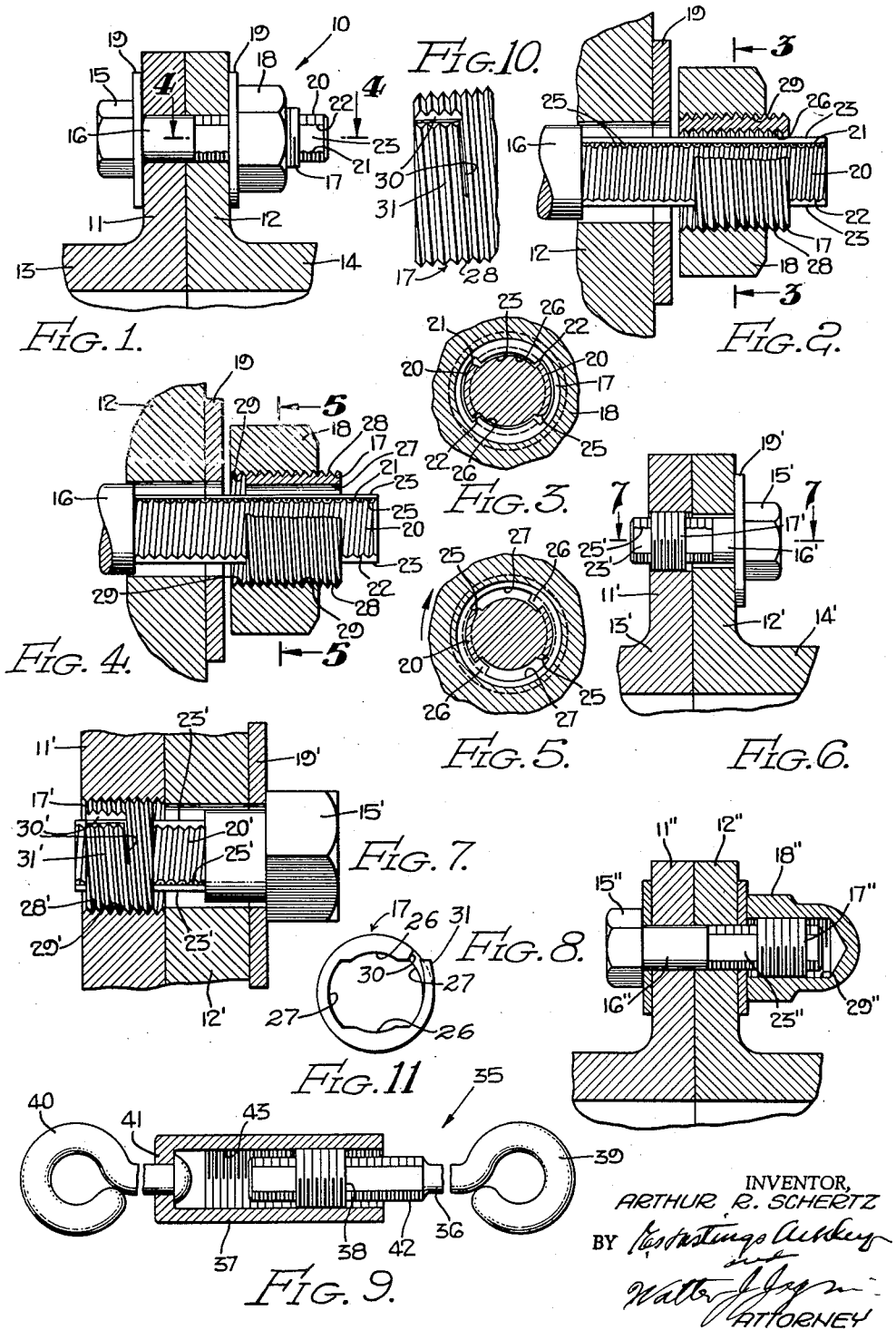
INVENTOR,
ARTHUR R. SCHERTZ United States Patent Office 3,163,079
Patented Dec. 29, 1964

3,163,079
FAST ACTION SELF LOCKING THREADED CONNECTOR WITH RIGHT AND LEFT HAND THREADS
Arthur R. Schertz, Taft, Calif., assignor to S & S Research & Development, Inc., a corporation of Texas
Filed Apr. 5, 1963, Ser. No. 271,018
12 Claims. (Cl. 85—1)

This invention relates to threaded connectors and more particularly to an improved fast action self-locking connector having as essential elements inner and outer threaded members and an intervening cooperating threaded sleeve, these elements being so made and arranged as to provide for wide-range relative rotary movement under load and permitting rapid separation of the parts immediately upon relaxation of the load as well as providing positive locking action under tightened conditions.

This application is a continuation-in-part of my co-pending application for United States Letters Patent Serial No. 793,629, filed February 16, 1959, for Fast Action Self Locking Threaded Connector, which application was a continuation-in-part of my co-pending application for United States Letters Patent Serial No. 732,615, filed May 2, 1958, for Fast Action Threaded Connector, both now abandoned, and is being filed to replace said earlier filed application.

One of the serious disadvantages of threaded fasteners resides in the fact that the relatively rotatable threaded members having mating engagement with one another must be counter-rotated throughout their overlapping axial lengths during assembly and disassembly. In many applications of such fasteners a minimum of relative rotation occurs while the fastener is under load whereas many times this amount of relative rotation may be required to bring the threaded parts into load applying position. This shortcoming has been recognized for many years and various attempts have been made by designers to provide a fast action assembly wherein the parts can be assembled to the point of load application quickly and with a minimum of relative rotary movement. However, prior proposals having this capability as an objective have been subject to inherent defects and shortcomings largely offsetting the advantage gained by the provided facility for fast engagement and disengagement.

For example, among the fast action fastener devices heretofore proposed have been those of a type utilizing a threaded sleeve insert between a nut and the threaded shank of a cooperating bolt. In this type of fastener, the laterally opposite faces of the bolt shank are cut away axially of the threaded portion for the purpose of passing freely the threaded portions of the mating sleeve threads. The sleeve threads are similarly cut away along the diametrically opposed inner sides thereof to permit the telescopic assembly of the sleeve over the threaded portions of the bolt shank in a manner generally similar to that proposed in the connector of the present invention.

This prior art type of fastener exhibits the desired capability of quick assembly and disassembly of the nut and sleeve unit over the threaded end of the bolt until slack between the parts being fastened is taken up. However, this fastener has several serious defects. For example, wrenching of the nut in a direction to loosen the same invariably rotates the sleeve along with the nut with the result that the entire load on the nut is relieved following unscrewing of the nut through a very small arc far less than that desirably required to relax the load on the fastener. Furthermore, as loosening of the nut begins, the arc of mating contact between the bolt and the sleeve threads is reduced rapidly thereby greatly overloading the remaining contacting portions of these threads with the result that serious damage, if not actual failure, of these threads results. Even if the threads are strong enough to avoid this disastrous result, still the load on the fastener is released suddenly and before the nut has been wrenched as far as it desirably should be before the load stresses are relaxed with the result that the nut oftentimes is forcibly ejected from the end of the bolt, a happenstance presenting a hazard to surrounding property and particularly to workmen or others in the vicinity. Furthermore, the referred to prior type of fast action fastener lacks resistance to loosensing under vibration and shock operating conditions.

The foregoing and other disadvantages of prior fast action connectors are obviated by the present invention by reason of the new and peculiar arrangement of the threads between the several parts. Thus the inner pair of mating threads are inclined oppositely to the inclination of the outer pair of mating threads and are of somewhat larger pitch and depth. Owing to this opposite inclination and differing sizes of the two pairs of threads the tendency of the sleeve to rotate with the outer threaded member when releasing the load stress on the parts is eliminated. Stated otherwise, the opposite inclination of the two pairs of threads taken with their differential size provides assurance that the load on a fully tightened connector can be decreased at will at any time and in any desired amount without possibilty of relative rotation between the sleeve and the inner threaded member. Not until substantially the entire load has been relaxed between the parts being fastened is there any tendency for the sleeve to rotate relative to the inner threaded member. However, once the connector is substantially unloaded, the sleeve automatically begins to rotate along with the outer threaded member through the short arc required to disengage the pair of mating threads having portions thereof cut away for fast action separation. Accordingly, it will be understood that the invention provides a fast action connector wherein engagement and disengagement of the fast action components occurs automatically during unwrenching and as an incident to the release of the last portion of the load stress from the components.

Another and important feature of the present invention adding materially to its utility and convenience has reference to the provision of simple but highly effective spring friction means between the nut and the threaded sleeve providing assurance that the sleeve and nut will rotate in unison under certain conditions but not under others. The spring friction means preferably and by way of specific example comprises a tang formed from a threaded wall section of the sleeve which tang is sprung out of round the slight amount required to produce a definite friction drag on the juxtaposed threads of a nut mating therewith. This friction drag can be adjusted as desired and increases the friction losses between the sleeve and nut very appreciably over those between the interior sleeve threads and the bolt threads. For this reason the sleeve definitely tends to move with the nut until the load conditions on the fastener are such that the friction losses between the inner pair of threads exceed those between the outer pair or, when during tightening, the sleeve is forcibly restrained during continued wrenching of the nut to tighten it.

Still a further feature of the threaded fastener assembly here provided is its positive and virtually shake-proof characteristics.

Furthermore, the principles of the invention may be applied to threaded connectors of a great variety of forms and have innumerable applications. These include nuts and bolts of all kinds, cap screws, turnbuckles, jacks, adjustable load-supporting columns and a wide variety of related screw devices.

Accordingly, it is a primary object of the present invention to provide an improved fast action threaded device in which the several parts are adapted for fast disassembly and assembly relative to the point of load application, following the latter of which they are adapted for relative rotation to vary the loaded condition thereof in the usual manner.

Another object of the invention is the provision of an improved fast action threaded device comprising inner and outer concentrically arranged members adapted to be adjustably and threadedly locked together by an intervening sleeve member having inner and outer threads of opposite and slightly differing pitch mating with similarly pitched complemental threads of the inner and outer members.

Another object of the invention is the provision of a fast action threaded connector having threads adapted to mate with threads interiorly of a surrounding sleeve and wherein the exterior of the sleeve is provided with threads of the opposite pitch adapted to mate with similar threads of a third cooperative threaded member.

Another object of the invention is the provision of a shake-proof threaded fastener comprising a threaded shank, a threaded sleeve mating therewith and adjustably seating thereabout a mating threaded nut, said sleeve having appreciably greater frictional losses with said nut threads than with said shank threads, and the two pair of mating threads being inclined oppositely relative to the fastener axis.

Another object of the invention is the provision of a shake-proof fastener comprising concentrically arranged shank, sleeve and nut rotatably joined together by mating pairs of threads of different size and oppositely inclined pitches and including resilient and adjustable friction means associated with one pair of threads by which the friction losses between one pair of threads can be controlled relative to friction losses between the other pair of threads.

Another object is the provision of a fast action threaded disconnect utilizing a mating threaded shank and sleeve having transverse sectors of their threads cut away to facilitate fast axial assembly and disassembly before being relatively rotated and wherein a nut is threadedly assembled about the exterior of the sleeve, the arrangement being such that the nut will rotate through a major portion of a revolution independently of the sleeve to unload the connector following which further loosening of the nut is effective to rotate the sleeve to an extent permitting instantaneous separation of the components.

Another object is the provision of a fast action threaded disconnect featuring an internally and externally threaded sleeve having a threaded tang portion thereof deflected slightly radially from the adjacent threaded portions of the sleeve to provide additional and adjustable frictional resistance with a mating threaded member to which the same may be assembled.

These and other more specific objects will appear upon reading the following specification and claims and upon considering in connection therewith the attached drawing to which they relate.

Referring now to the drawing in which several preferred embodiments of the invention are illustrated:

FIGURE 1 is a side elevational view showing a fast action connector embodying this invention and tightened against the flanges of a pipe coupling, the latter being shown in cross-section;

FIGURE 2 is a fragmentary enlarged view of FIGURE 1 showing the parts of the connector unloaded and the nut portions displaced somewhat from the face of the flanges being clamped;

FIGURE 3 is a fragmentary cross-sectional view taken along line 3—3 of FIGURE 2;

FIGURE 4 is a fragmentary cross-sectional view on an enlarged scale taken along line 4—4 on FIGURE 1;

FIGURE 5 is a fragmentary view taken along line 5—5 on FIGURE 4;

FIGURE 6 is a side elevational view similar to FIGURE 1 showing a modified embodiment of the connector, one of the pipe flanges there being threaded to take the place of the nut employed in the FIGURE 1 embodiment;

FIGURE 7 is a cross-section on an enlarged scale taken along line 7—7 on FIGURE 6;

FIGURE 8 is a view similar to FIGURE 1 of a further embodiment of the invention;

FIGURE 9 is a longitudinal sectional view through still another embodiment of the invention incorporated in a turnbuckle;

FIGURE 10 is a fragmentary side view on an enlarged scale of the threaded sleeve showing the resilient tang which is adapted to cooperate with the nut threads when assembled thereto to increase the friction losses of the threads for the purpose of this invention; and, FIGURE 11 is an end view of FIGURE 10 on a slightly reduced scale and taken from the right hand end of FIGURE 10.

Referring to FIGURES 1 to 4, there is shown a preferred embodiment of the invention and providing a fast action threaded connector assembly suitable for securing a plurality of parts, such as the abutting flanges 11 and 12 on adjacent ends of pipe sections 13 and 14. Assembly 10 includes a bolt having a hexagonal head 15, a generally cylindrical threaded shank 16, a threaded sleeve 17 and a nut 18. A pair of conventional washers 19, 19 underlie nut 18 and the head 15 of the bolt.

The greater portion of the length of the shank of the bolt is provided with threads 20 here shown as being left handed, these threads being segregated in two strips located diametrically opposite one another with their opposite lateral edges 21, 22 lying parallel to one another and to the axis of the bolt. Where threads 20 are of the so-called left hand type, it will be apparent that lateral edge 21 may be appropriately described as the trailing edge whereas lateral edge 22 is the leading edge. The reason for referring to these two edges as the leading and trailing edges will become apparent presently.

The portion of bolt shank 16 lying between the lateral edges 21, 22 of threaded portions 20, 20 and designated 23 herein is cut away along its diametrically opposed sides to at least the roots of threads 20 throughout the axial extent of these threads. Suitable stops 25 are provided at the trailing ends 21 of at least one section of threads 20 as by upsetting or swaging over this end of the threads to at least partially close the thread grooves. It will therefore be understood that the trailing ends of threads 20 are provided with stops or abutments 25 whereas the leading or entrance ends 22 of threads 20 are freely open to admit the mating threads carried by the inner surface of sleeve 17.

Sleeve 17 is threaded throughout its length interiorly and exteriorly thereof, interior threads 26 being inclined in the same direction as threads 20 and being of the same size and design to mate easily therewith. It will be understood that sleeve threads 26 are cut away along the diametrically opposed sides of the sleeve in the same manner described above in connection with threads 20 to provide unthreaded strips 27, 27 (FIGURE 5) having a circumferential extent slightly greater than the circumferential distance between 21, 22 of bolt threads 20. Accordingly, and as is made clear by FIGURE 3, threaded portions 26, 26 of the sleeve are freely slidable along the cut away portions 23, 23 of the bolt, whereas threaded portions 20, 20 of the bolt are freely slidable along the cut away portions 27, 27 of the sleeve. So long as the sleeve and the bolt are oriented to the position shown in FIGURES 2 and 3 the sleeve and nut assembly 17 can be slid freely axially of the bolt to a position flush against the face of washer 19. Thereafter, clockwise turning of the nut to the right carries the leading ends of threads 26 into mating engagement with the entrance ends 22 of bolt threads 20, since the larger area of contact between the full threads of the nut with the full threads of the sleeve provides a greater frictional engagement therebetween than does the lesser frictional engagement between the fragmentary or partial threads 26 of the bore of the sleeve with the partial threads 20 of the bolt; particularly, since there is no substantial axial or longitudinal thrust or force acting between the sleeve and the bolt and nut at this point. Also, since the partial threads 26 of the sleeve and the partial threads 20 of the bolt are left hand threads, the clockwise turning of the nut tends to move the sleeve outwardly of the bolt away from the washer and facilitates the entry of the partial threads of the sleeve into meshed mating engagement with the partial threads 20 of the bolt. Threads 20 and 26 continue to merge in mating relation until the leading ends of threads 26 abut stops 25 in which position threads 20 and 26 are fully mated. Continued clockwise rotation of nut 18 then takes place independently of sleeve 17 which is locked stationary with respect to the bolt by reason of the abutment of the leading end of threads 26 with stops 25.

The exterior surface of sleeve 17 and the juxtaposed interior surface of nut 18 are provided with similar but slightly smaller pitch mating right hand threads 28 and 29, respectively. It will therefore be recognized that once sleeve 17 is locked against rotation by stops 25, nut 18 can be tightened as it is rotated relative to sleeve 17 to whatever extent required to load the bolt to a desired load stress. This additional rotation may be a fraction of a revolution or as much as several revolutions.

Should the user wish to adjust the load stress on the connector at any time, it is merely necessary to apply a wrench to nut 18 in the usual manner backing off counterclockwise and without risk of changing the position of sleeve 17 relative to bolt shank 16 and the fully mated positions of threads 20 and 26. Owing to the opposite pitches of the outer and inner pairs of threads, any tendency of the sleeve to rotate counterclockwise along with the nut during the stress adjusting operation always acts to increase the stress load on both the shank of the bolt as well as threads 20 and threads 26 mating therewith. This result is assured not alone by the opposite inclination of the pairs of threads but additionally by the differential pitches of the threads, the threads 20 on the bolt and the threads 26 in the bore of the sleeve being inclined at a steeper pitch than the threads 28 on the exterior of the sleeve and the threads 29 in the bore of the nut. Thus the rate of stress increase will be greater on the larger and steeper pitch bolt threads 20 with the result that relative rotation under load conditions occurs between the mating outer pair of threads. For this reason it will be recognized that sleeve 17 remains stationary during the adjusting wrenching of nut 18 which may be re-adjusted to any desired position under load without danger of changing the position of sleeve 17 relative to the bolt shank. This is true irrespective of whether the connector assembly is being tightened or slightly relaxed.

A further and important structural feature providing assurance of smooth and certain operation of the components in the manner just described, notwithstanding variations in manufacturing tolerances between the several threads as well as perverse environmental and operating conditions, will now be described. For example, grit and foreign matter, machine tool burrs and the like handicaps present between the threads can disrupt or reverse the desired differential frictional conditions between the thread pairs to interfere with the intended mode of operation. Such happenstances unavoidable under field conditions are effectively avoided in the connector assembly of this invention by introducing supplemental resistance between one pair of threads, as for example the outer pair. One particularly satisfactory way of doing so is best illustrated in FIGURES 7, 10 and 11.

Referring more particularly to FIGURES 10 and 11, it will be understood that sleeve 17 is provided with an L-shaped slot 30 with one leg thereof opening axially through one end of sleeve 17 and lying closely adjacent the entrance end of inner threads 26. The other leg of slot 30 extends circumferentially across cut away portion 27 of threads 26 and along the root of one of exterior threads 28 in the manner made clear by FIGURE 10. The free end of tang 31 so formed by L-shaped slot 30 is then deflected radially outward to the extent found necessary to impose a definite and substantial frictional drag as the tang is screwed into mating threads 29 of nut 18. The beveled ends of the threads on the free end of the tang prevents those threads from gouging into or digging into the mating threads of the nut with which the sleeve is threadedly meshed.

In use sleeve 17 is assembled into nut 18 until the inner end of the sleeve is substantially flush with the inner end face of the nut. Bolt 15, 16 is then assembled to the parts being fastened along with washers 19, 19 following which the pre-adjusted nut and sleeve are slipped along the threaded end of the bolt shank as described above. When the parts have been fully telescoped together with threads 20, 26 out of engagement, the nut and sleeve assembly is rotated clockwise in the usual manner through an arc of about 90 degrees to mate threads 20, 26, this movement being arrested as the leading ends of threads 26 abut stops 25 across the leading ends of threads 20. No relative rotation occurs during this portion of the assembly between sleeve threads 28 and nut threads 29 owing to the friction between these threads additionally augmented by the frictional drag of resilient tang 31 on threads 29. However, once threads 26 abut stops 25, further clockwise wrenching of nut 18 causes the nut to rotate on stationary sleeve 17 to the extent necessary to stress the connector to its full load stress.

Should there be any tendency for the fully loaded fastener to loosen it will be understood that such tendency is fully and effectively thwarted by the reverse inclination of the described two pairs of threads operating in opposition to one another taken in connection with the frictional drag provided by resilient tang 31 of sleeve 17. Accordingly, the described assembly is found to provide a positive and unusually effective lock nut.

To reduce the degree of tightening it is only necessary to wrench nut 18 counterclockwise to the extent desired. Even though tang 31 continues to maintain a high frictional drag on threads 29, reverse wrenching always is effective to rotate the nut while sleeve 17 remains stationary owing to the differing and opposite pitches of the two pairs of concentrically arranged threads. Any tendency of sleeve 17 to counter-rotate with the nut immediately tends to increase the tension sharply on bolt shank 16 thereby increasing the frictional load on threads 20, 26. In consequence, the sleeve remains fully seated with threads 20 until reverse wrenching has removed substantially all load stress on the bolt. At this time the friction between threads 20, 26 falls below that between threads 28, 29 whereupon sleeve 17 counter-rotates in unison with nut 18 to disengage threads 20, 26 freeing the nut and sleeve for free sliding movement axially of the bolt.

Although in the described fastener the cut away portions of the threads are disclosed as being on the shank of the bolt and on the interior of the sleeve, it will be recognized that these cut away portions may be provided between the nut and the external threads of the sleeve should this reversal of these features be advantageous in a particular operating environment. In this event, it would be desirable to apply wrenching to the head of the bolt rather than to the nut.

Another preferred embodiment of the invention is illustrated in FIGURES 6 and 7 wherein the same or similar features to those shown in FIGURES 1 to 5 are designated by the same reference characters distinguished by the addition of a prime. Substantially the only difference between the two embodiments resides in the fact that flange 11' of the pipe coupling is provided with a bore threaded with right hand threads 29' and mating with the threads 28' on the exterior of sleeve 17'. Additionally, stops 25' are located at the trailing ends of threads 20' owing to the fact that the cap screw is rotated into the mating interior threads of sleeve 17' during wrenching to load the connector. Accordingly, it will be recognized that the threaded bore in flange 11' takes the place of nut 18 in the first embodiment. In this case the bolt is used as a cap screw and wrenching is applied to the non-circular or hexagonal head 15'.

In the use of the embodiment shown in FIGURES 6 and 7, sleeve 17' is assembled into the threaded bore of flange 11' with its right hand end, viewed in FIGURE 7, generally flush with the adjacent face of coupling flange 11'. Thereafter the cap screw portion of the fastener is assembled axially into the sleeve in the manner described above in connection with FIGURES 1 to 5, after which the cap screw is rotated clockwise causing the leading or open ends of threads 20' to enter the adjacent ends of the threads provided on the interior of sleeve 17', the rotation continuing until the trailing ends of interior threads of sleeve 17' abut stops 25' on the trailing ends of threads 20'. Continued clockwise wrenching of the cap screw then rotates sleeve 17' along the cap screw advancing toward the left as viewed in FIGURE 7 and placing the cap screw under tension as the flanges 11' are forced tightly together. Resilient tang 31' functions exactly in the same manner described above to prevent relative rotation of sleeve 17' and stationary part 11' under certain conditions while assuring relative rotation under other conditions, all in a manner readily apparent to the reader in view of the foregoing detailed discussion.

The connector shown in FIGURES 6 and 7 may be adjusted to relax the load on the threaded components in the same manner described above in connection with FIGURES 1 to 5, and without danger of relative rotation between sleeve 17' and the threaded shank of the cap screw. However, upon unwrenching sufficiently to unload the cap screw, a point is reached at which continued unwrenching is effective to rotate the cap screw independently of sleeve 17' sufficiently to disengage the mating threads 20' and corresponding threads on the interior of the sleeve. Unwrenching through a very short distance at this point suffices to disengage the threads leaving the cap screw free for withdrawal from the sleeve.

Referring to FIGURE 8, there is shown still another preferred embodiment of the invention which differs from that shown in FIGURES 1 to 5 in having an acorn or crown-type double nut 18" having a longer than usual internal threaded bore 29". The right hand threads 29" mate with similar threads on the exterior of sleeve 17" and the construction operates in the same manner described above in all respects. However, it is pointed out and emphasized that the crowned nut completely encloses the exterior ends of the threaded parts thereby safeguarding against the entry of water and foreign material which otherwise might collect in the cut away portions of the threads and interfere with the smooth and proper operation of the connector.

Referring now to FIGURE 9, there is shown still another embodiment of the invention here illustrated as being in the form of a turnbuckle designated generally 35 and including an inner rod member 36, an outer tubular member 37 and an intervening internally and externally threaded sleeve 38. As shown, the inner and outer members 36 and 37 are provided at their opposite remote ends with eyelets 39, 40 adapted to have an external load connected therewith, it being noted that eyelet 40 is rotatably supported within the closed outer end 41 of tubular member 37. It will be understood that the exterior of member 37 may be and preferably is provided with flats to seat a wrench. The outer end of member 36 may be similarly constructed to facilitate adjustment of the turnbuckle. It will be understood that the threaded shank portion 42 of inner member 36, of sleeve member 38, as well as the interiorly threaded portion of outer member 37, are provided with pairs of mating threads inclined oppositely to one another and otherwise incorporating all the features described above in connection with FIGURES 1 to 8.

Although the cut away portions providing for the free axial movement of the parts during assembly and disassembly operations are shown as provided between inner member 36 and the interior of sleeve 38, it will be understood that these cut away portions may be provided between the threaded exterior of the sleeve and the threaded interior of outer member 37. Also, the frictional means provided by the tang formed on the sleeve may be directed inwardly of the sleeve into engagement with the threads of the bolts or the inner member 36 so that the frictional engagement between the sleeve and the inner member will be greater than the frictional engagement between the sleeve and the outer member having the cut away thread portions thereon. In this case, the inner member and sleeve will be inserted into the bore of the outer member, the cut away portions of the threads being moved axially over the remaining thread portions of such members to bring the outer member and the inner member having the sleeve thereon into operative position. Thereafter rotation of the inner member and sleeve with respect to the outer member will cause engagement of the partial threads of the sleeve and the outer member until the leading edge of the partial threads of the sleeve or of the outer member engage the stops at the trailing edge of the outer member or of the sleeve, whereupon further rotative movement of the sleeve with respect to the outer member will be halted and the inner member may then be rotated in the sleeve. It will be further recognized that although the FIGURE 9 embodiment is shown as a turnbuckle, the essential features of the threaded connector between the parts thereof may be similarly incorporated in a load-lifting jack, a load-bearing adjustable column and many other similar environments wherein a wide range of axial adjustment is desirable coupled with the ease and rapidity of disassembly and reassembly when the parts are not under load. It is further pointed out that each embodiment preferably includes resilient tank 31 in sleeve 17 as well as the oppositely inclined differentially sized pairs of mating threads.

While the particular fast action threaded assembly herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

What is claimed and desired to be secured by Letters Patent is:

1. A fast action readily separable concentrically arranged tube, sleeve and post assembly adapted to be loaded axially thereof in either tension or compression, said assembly comprising an inner post member provided with helical threads axially thereof mating with similar threads from end to end along the interior of said sleeve, the exterior of said sleeve having threads inclined oppositely to the aforedescribed mating threads and mating with similar threads extending axially along the interior of said tube member, one mating pair of said threads of said sleeve and one of said tube and post members being cut away to their respective roots along diametrically opposed strips extending axially of said assembly and having a circumferential width generally similar to the width of the intervening threads whereby one of said members is freely movable axially of said sleeve when the cut away strips on said one member are rotated out of engagement with the mating threads on said sleeve; friction means on said sleeve and engageable with the other of said tube and post members having the full threads thereon and slidable with relation thereto to provide a slidable frictional drag between said sleeve and said other member having the full threads thereon whereby rotation of said sleeve and said other member having the full threads thereon is restrained by such slidable frictional drag means; and stop means at the trailing ends of the partial threads of one member engageable with the leading ends of the partial threads of the other member mating therewith to prevent further relative rotary movement between said members after said threads have become fully meshed and such engagement has taken place.

2. A fast action threaded connector utilizing inner and outer threaded members and an intervening threaded sleeve having inner and outer threads adapted to mate with the threads respectively of said inner and outer threaded members, one pair of said mating threads being left hand and the other pair of mating threads being right hand, and one of said pairs of mating threads on one of said members and said sleeve being cut away to the roots thereof on said member and said sleeve a circumferential distance at least equal to the remaining thread portions on said member and said sleeve along a plurality of circumferentially spaced strips extending axially of said member and said sleeve whereby said sleeve is freely movable axially of said one member when the threads of the latter are aligned with the cut away strips of said sleeve; stop means at the trailing ends of the partial threads of said one member and said sleeve engageable with the leading ends of the partial threads of the other of said sleeve and said one member to prevent further relative rotary movement between said sleeve and said one member after said threads have become fully meshed and such engagement has taken place; said sleeve being slit in a thin walled section thereof to provide a tang deflected slightly in a radial direction to project relative to the surface of the sleeve having the full threads thereon into engagement with the mating thread surface of the other member having the full threads thereon to engage the threads mating therewith with frictional drag and in an amount related to the deflection of said tang, the free end of said tang being formed to slidably engage the mating threads of said other threaded member having the thread surface thereon which is not cut away.

3. A fast action threaded connection having an inner externally threaded member and an outer internally threaded member and an intervening threaded sleeve having internal and external threads adapted to mate with the threads of said inner and said outer threaded member, respectively, and wherein: one pair of said mating threads of said sleeve and inner and outer members comprising a left hand thread and the other pair of said mating threads of said inner and outer members and said sleeve comprises a right hand thread, and one of said pairs of mating threads of said sleeve and one of said inner and outer members is cut away to the roots thereof on each of said sleeve and said one of said inner and outer member on which said threads are formed complementally to the threads of said sleeve, said threads being cut away along a plurality of circumferentially spaced longitudinally extending complemental strips, the remaining threads of the inner of said one of said members and sleeve being lesser in circumferential extent than the remaining threads of said outer of said one of said member and said sleeve, whereby said member and said sleeve are relatively movable longitudinally of each other without engagement of said remaining portions of the threads thereon when the threads of the member are aligned with the cutaway strips of the sleeve; stop means in the thread grooves at the trailing ends of the thread portions of at least one of the remaining portions of threads on said one of said members and said sleeve whereby the entering ends of the thread portion engaged in threaded relation with said thread portion having said stop means engages said stop means to limit further relative rotation of said one of said members and said sleeve; and slidable friction means in the threaded engagement of the mating threads of the other of said inner and outer members and said sleeve providing a greater frictional engagement between said other of said members and said sleeve than does the engagement of the portions of threads between said one of said members and said sleeve, whereby said sleeve is moved by said greater frictional engagement into threaded relation with said one of said members until said entering ends of said thread portions engage said stop means.

4. A fast action threaded connection of the character set forth in claim 3 wherein the mating threads of said member and said sleeve which are not cut away are formed with a lesser pitch than are the mating thread portions of said sleeve and the other member which are cut away.

5. A fast action threaded connection having an inner externally threaded member and an outer internally threaded member and an intervening threaded sleeve having internal and external threads adapted to mate with the threads of said inner and said outer threaded members, respectively, and wherein: one pair of said mating threads of said sleeve and inner and outer members comprises a left hand thread and the other pair of said mating threads of said inner and outer members and said sleeve comprises a right hand thread, and one of said pairs of mating threads, one of said sleeve and one of said inner and outer members is cut away to the roots thereof on each of said sleeve and said one of said inner and outer member on which said threads are formed complementally to the threads of said sleeve, said threads being cut away along a plurality of circumferentially spaced longitudinally extending complemental strips, the remaining threads of the inner of said one of said members and sleeve being lesser in circumferential extent than the remaining threads of said outer of said one of said member and said sleeve, whereby said member and said sleeve are relatively movable longitudinally of each other without engagement of said remaining portions of the threads thereon when the threads of the member are aligned with the cut away strips of the sleeve; stop means in the thread grooves at the trailing ends of the thread portions of at least one of the remaining portions of threads on said one of said members and said sleeve whereby the entering ends of the thread portion engaged in threaded relation with said thread portion having stop means engages said stop means to limit further relative rotation of said one of said members and said sleeve; the threaded engagement of the mating threads of the other of said inner and outer members and said sleeve providing a greater frictional engagement between said other of said members and said sleeve than does the engagement of the portions of threads between said one of said members and said sleeve, whereby said sleeve is moved by said greater frictional engagement into threaded relation with said one of said members until said entering ends of said thread portions engage said stop means; and supplemental friction means on one of said sleeve and said other of said members slidably engaging the other thereof to provide a frictional drag between said sleeve and said other member supplementing the frictional engagement of the threads thereof whereby rotation of said sleeve and said other member with respect to each other is further restrained by such slidable frictional engaging means.

6. A fast action threaded connection having an inner externally threaded member and an outer internally threaded member and an intervening threaded sleeve having internal and external threads adapted to mate with the threads of said inner and said outer threaded members, respectively, and wherein: one pair of said mating threads of said sleeve and inner and outer members comprises a left hand thread and the other pair of said mating threads of said inner and outer members and said sleeve comprises a right hand thread, and one of said pairs of mating threads of said sleeve and one of said inner and outer members is cut away to the roots thereof on each of said sleeve and said one of said inner and outer member on which said threads are formed complementally to the threads of said sleeve, said threads being cut away along a plurality of circumferentially spaced longitudinally extending complemental strips, the remaining threads of the inner of said one of said members and sleeve being lesser in circumferential extent than the remaining threads of said outer of said one of said member and said sleeve, whereby said member and said sleeve are relatively movable longitudinally of each other without engagement of said remaining portions of the threads thereon when the threads of the member are aligned with the cut away strips of the sleeve; stop means in the thread grooves at the trailing ends of the thread portions of at least one of the remaining portions of threads on said one of said members and said sleeve whereby the entering ends of the thread portion engaged in threaded relaion with said thread portion having said stop means engages said stop means to limit further relative rotation of said one of said members and said sleeve; the threaded engagement of the mating threads of the other of said inner and outer members and said sleeve providing a greater frictional engagement between said other of said members and said sleeve than does the engagement of the portions of threads between said one of said members and said sleeve, whereby said sleeve is moved by said greater frictional engagement into threaded relation with said one of said members until said entering ends of said thread portions engage said stop means; and supplemental friction means comprising a radially deflected tang formed in said sleeve by slitting said sleeve along at least an L-shaped line adjacent one end thereof and deflecting said tang radially of said sleeve into sliding frictional engagement with the other of said inner and outer members to provide a frictional drag between said sleeve and said other member supplementing the frictional engagement of the threads of the sleeve and said other member whereby rotation of said sleeve and said other member with respect to each other is further restrained by such frictional engagement of said radially deflected tang, the amount of drag between said sleeve and said other member being related to the degree of deflection of the tang with respect to the axis of the sleeve, the threads of the free end of the tang being beveled to permit the same to slide along the threads of said other member.

7. A fast action threaded connection of the character set forth in claim 6 wherein the mating threads of said member and said sleeve which are not cut away are formed with a lesser pitch than are the mating thread portions of said sleeve and the other member which are cut away.

8. A fast action threaded connector comprising: inner and outer threaded members and an intervening threaded sleeve having inner and outer threads adapted to mate with the threads of said inner and outer threaded members respectively, one pair of said mating threads being left hand and the other pair of said mating threads being right hand, the mating threads of said inner threaded member and said sleeve being cut away to the roots thereof along a plurality of circumferentially spaced longitudinal strips a circumferential distance at least equal to the remaining thread portions of said sleeve and said inner member to provide a plurality of circumferentially spaced longitudinally extending remaining thread strip portions, the remaining threads of the inner member being lesser in circumferential extent than the remaining inner threads of the sleeve, whereby said inner member and said sleeve are relatively movable longitudinally of each other without engagement of said remaining portions of the threads thereon when the threads on the inner member are aligned with the cut away strips of the inner threads of the sleeve; the trailing ends of the remaining threads of the inner member having formed in the grooves thereof abutment stop means engageable by the leading ends of the remaining portions of the threads of said sleeve for limiting rotative movement of said remaining portions of said sleeve threads within said remaining thread portions of said inner member whereby the remaining portions of the threads of said sleeve and said member are held in threaded engagement with each other by the engagement of the entering ends of the remaining thread portions of the sleeve with the abutment stop means at the trailing ends of the remaining threads of said inner member; the threaded engagement of the mating threads on the exterior of the sleeve and in the outer threaded member providing a greater frictional engagement between said outer threaded member and said sleeve than does the engagement of the remaining portions of the threads between the inner member and said sleeve, whereby said sleeve is moved by said greater frictional engagement into threaded relation with said inner member until said entering ends of said remaining thread portions of said sleeve engage the stop means at the trailing ends of the remaining thread portions of said inner member; and supplemental frictional means on said sleeve slidably engaging said outer member supplementing the frictional engagement between the full threads of said sleeve and said outer threaded member.

9. A fast action threaded connector comprising: inner and outer threaded members and an intervening threaded sleeve having inner and outer threads adapted to mate with the threads of said inner and outer threaded members respectively, one pair of said mating threads being left hand and the other pair of said mating threads being right hand, the mating threads of said inner threaded member and said sleeve being cut away to the roots thereof along a plurality of circumferentially spaced longitudinal strips a circumferential distance at least equal to the remaining thread portions of said sleeve and said inner member to provide a plurality of circumferentially spaced longitudinally extending remaining thread strip portions, the remaining threads of the inner member being lesser in circumferential extent than the remaining inner threads of the sleeve, whereby said inner member and said sleeve are relatively movable longitudinally of each other without engagement of said remaining portions of the threads thereon when the threads on the inner member are aligned with the cut away strips of the inner threads of the sleeve; the trailing ends of the remaining threads of the inner member having formed in the grooves thereof abutment stop means limiting rotative movement of said remaining thread portions of said inner member whereby the remaining portions of the threads of said sleeve and said member are held in threaded engagement with each other by the engagement of the entering ends of the remaining thread portions of the sleeve with the abutment stop means at the trailing ends of the remaining threads of said inner member; the threaded engagement of the mating threads on the exterior of the sleeve and in the outer threaded member providing a greater frictional engagement between said outer threaded member and said sleeve than does the engagement of the remaining portions of the threads between the inner member and said sleeve, whereby said sleeve is moved by said greater frictional engagement into threaded relation with said inner member until said entering ends of said remaining thread portions of said sleeve engage the stop means at the trailing ends of the remaining thread portions of said inner member; and supplemental frictional means on one of said outer threaded member and said sleeve slidably engaging the other thereof to provide a slidable frictional drag between said sleeve and said other member assisting the frictional engagement between the threads of said members to cause rotation of said sleeve with said outer member.

10. A fast action threaded connector comprising: inner and outer threaded members and an intervening threaded sleeve having inner and outer threads adapted to mate with the threads of said inner and outer threaded members respectively, one pair of said mating threads being left hand and the other pair of said mating threads being right hand, the mating threads of said inner threaded member and said sleeve being cut away to the roots thereof along a plurality of circumferentially spaced longitudinal strips a circumferential distance at least equal to the remaining thread portions of said sleeve and said inner member to provide a plurality of circumferentially spaced longitudinally extending remaining thread strip portions, the remaining threads of the inner member being lesser in circumferential extent than the remaining inner threads of the sleeve, whereby said inner member and said sleeve are relatively movable longitudinally of each other without engagement of said remaining portions of the threads thereon when the threads on the inner member are aligned with the cut away strips of the inner threads of the sleeve; the trailing ends of the remaining threads of the inner member having formed in the grooves thereof abutment stop means limiting rotative movement of said remaining portions of said sleeve threads within said remaining thread portions of said inner member whereby the remaining portions of the threads of said sleeve and said member are held in threaded engagement with each other by the engagement of the entering ends of the remaining thread portions of the sleeve with the abutment stop means at the trailing ends of the remaining threads of said inner member; the threaded engagement of the mating threads on the exterior of the sleeve and in the outer threaded member providing a greater frictional engagement between said outer threaded member and said sleeve than does the engagement of the remaining portions of the threads between the inner member and said sleeve, whereby said sleeve is moved by said greater frictional engagement into threaded relation with said inner member until said entering ends of said remaining thread portions of said sleeve engage the stop means at the trailing ends of the remaining thread portions of said inner member, said sleeve being slit in a thin walled section thereof to provide a tang which is deflected radially outwardly of said sleeve into sliding frictional engagement with said outer threaded member to provide supplemental frictional drag between said sleeve and said outer threaded member for causing rotation of said sleeve with said outer member, said tang having the threads at the free end thereof beveled to slidably engage the outer threaded member without biting into said outer member.

11. A fast action threaded connector of the character set forth in claim 10, wherein the external threads of the sleeve and the internal threads of the outer member are formed with a lesser pitch than the internal threads of the sleeve and the external threads of the inner member, whereby the outer member may be rotated on the sleeve to release the axial force between said outer member and said inner member before the thread portions of the sleeve and the inner member are disengaged.

12. A quick acting threaded connector for connecting two elements for movement toward each other, said connector comprising an outer internally threaded member connected to one of said elements, an inner externally threaded bolt member connected to the other of said elements, and a cylindrical sleeve interposed between said internal bolt member and said external member and being internally and externally threaded to correspond to the threads of said internal bolt member and said external member, the threads of said internal bolt member being inclined in an opposite direction relative to the axis of said member with respect to the inclination of the internal threads of said external member, whereby the threads internally and externally of said sleeve mating therewith are likewise inclined in opposite directions relative to the axis of said sleeve, the mating threads of said sleeve and one of said internal bolt member and said outer member being cut away along longitudinally extending strip areas thereof to the roots of said threads to provide a plurality of circumferentially spaced longitudinally extending remaining thread strip portions, said cut away portions extending circumferentially of said sleeve and said one member a distance at least equal to the remaining thread portions of said sleeve and said one member, whereby when the remaining threaded portions of said sleeve and said one member are disposed in the cut away portions of the other, said sleeve and said one member are movable with respect to each other in axial longitudinal directions; the trailing ends at least one of the remaining strip portions on one of said sleeve and said one member being formed with abutment stop means in the grooves thereof disposed to be engaged by the entering ends of the remaining thread portions of the other of said sleeve and said one member when said thread portions are moved into threaded engagement with each other, whereby said remaining thread portions of said sleeve and said one member are prevented from further rotative movement out of threaded relationship and the other of said inner and outer members may then be rotated with respect to said sleeve, such continued rotation of said other member with respect to said sleeve causing relative longitudinal movement of said other member with respect to said sleeve in a direction opposite to the direction of the relative longitudinal movement of said sleeve with respect to said one member; the frictional engagement of the threads of said other member with the threads of said sleeve being of a greater value than the frictional engagement of the remaining portions of the threads of said sleeve with the remaining portions of the threads of said one member; and supplemental friction means on said sleeve slidably engageable with the full threads of the other of said bolt member and said external member for supplementing the frictional engagement of such full threads of said other member and said sleeve, whereby rotation of said other member about its axis causes rotation of said sleeve until said engagement between the entering ends of the remaining thread portions of one of said sleeve and said one member with the abutment stops at the trailing ends of the remaining thread portion of the other of said sleeve and said one member occurs, whereupon said other member may rotate with respect to said sleeve to cause relative longitudinal telescoping movement between said other member and said one member and thereby moving said elements to be connected toward each other.

References Cited in the file of this patent

UNITED STATES PATENTS

| 925,448 | Boyden | June 22, 1909 |
| 1,080,332 | Dodds | Dec. 2, 1913 |
| 1,451,970 | Taylor | Apr. 17, 1923 |

FOREIGN PATENTS

| 737,048 | France | Sept. 27, 1932 |
| 901,872 | Germany | Jan. 14, 1954 |
| 1,782 of 1891 | Great Britain | Jan. 31, 1891 |

UNITED STATES PATENT OFFICE
CERTIFICATE OF CORRECTION

Patent No. 3,163,079

December 29, 1964

Arthur R. Schertz

It is hereby certified that error appears in the above numbered patent requiring correction and that the said Letters Patent should read as corrected below.

Column 4, line 68, after "between" insert -- ends --; column 10, line 35, strike out ", one"; column 11, line 28, for "relaion" read -- relation --.

Signed and sealed this 17th day of August 1965.

(SEAL)
Attest:

ERNEST W. SWIDER
Attesting Officer

EDWARD J. BRENNER
Commissioner of Patents